(12) United States Patent
Gu et al.

(10) Patent No.: US 9,355,001 B1
(45) Date of Patent: *May 31, 2016

(54) METHOD AND APPARATUS FOR SELECTING AN OPERATING FREQUENCY OF A CENTRAL PROCESSING UNIT, BASED ON DETERMINING A MILLIONS OF INSTRUCTION PER SECOND (MIPS) VALUE ASSOCIATED WITH THE CENTRAL PROCESSING UNIT

(71) Applicant: Marvell International Ltd., Hamilton (BM)

(72) Inventors: Qinwei Gu, Shanghai (CN); Yu Bai, Shrewsbury, MA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,728

(22) Filed: Apr. 24, 2014

Related U.S. Application Data

(63) Continuation of application No. 12/942,599, filed on Nov. 9, 2010, now Pat. No. 8,732,488, which is a continuation-in-part of application No. 12/400,604, filed on Mar. 9, 2009, now Pat. No. 8,281,160.

(60) Provisional application No. 61/260,722, filed on Nov. 12, 2009, provisional application No. 61/045,714, filed on Apr. 17, 2008.

(51) Int. Cl.
*G06F 1/00* (2006.01)
*G06F 11/30* (2006.01)

(52) U.S. Cl.
CPC ................................ *G06F 11/3062* (2013.01)

(58) Field of Classification Search
CPC ........................................................ G06F 1/32
See application file for complete search history.

(56) References Cited

U.S. PATENT DOCUMENTS

| | | | |
|---|---|---|---|
| 6,366,522 B1 * | 4/2002 | May ........................ | G06F 1/08 365/227 |
| 6,762,629 B2 | 7/2004 | Tam et al. | |
| 6,788,156 B2 | 9/2004 | Tam et al. | |
| 6,996,441 B1 | 2/2006 | Tobias | |
| 7,502,948 B2 | 3/2009 | Rotem et al. | |
| 7,730,340 B2 | 6/2010 | Hu et al. | |
| 7,752,470 B2 | 7/2010 | Huang et al. | |
| 8,051,310 B2 | 11/2011 | He et al. | |
| 2003/0023660 A1 | 1/2003 | Kosanovic | |
| 2003/0028581 A1 | 2/2003 | Kosanovic | |
| 2003/0074487 A1 | 4/2003 | Akgul et al. | |
| 2004/0199803 A1 | 10/2004 | Suzuki et al. | |
| 2005/0076253 A1 | 4/2005 | Lu | |
| 2005/0289218 A1 | 12/2005 | Rothman et al. | |

(Continued)

*Primary Examiner* — Mohammed Rehman

(57) ABSTRACT

Embodiments of the present invention provide a method that comprises, within a sample window, determining an active time of a central processing unit (CPU) at an operating frequency. If there are any different operating frequencies within the sample window, the method further comprises determining active times of the CPU at the different operating frequencies within the sample window and, based upon the active times for the operating frequencies within the sample window, calculating a millions of instructions per second (MIPS) value for the sample window. The method further comprises performing a comparison of the MIPS value to a threshold value and, based upon the comparison of the MIPS value to the threshold value, setting an operating frequency of the CPU for a next sample window.

18 Claims, 4 Drawing Sheets

(56) References Cited

U.S. PATENT DOCUMENTS

| | | | |
|---|---|---|---|
| 2006/0088023 A1* | 4/2006 | Muller | H04H 20/67 370/350 |
| 2007/0016814 A1 | 1/2007 | Rusu et al. | |
| 2007/0055683 A1 | 3/2007 | Grotjohn et al. | |
| 2007/0150893 A1 | 6/2007 | Grobman | |
| 2008/0168289 A1* | 7/2008 | Noh | G06F 1/32 713/323 |
| 2009/0172378 A1 | 7/2009 | Kazmierczak et al. | |
| 2009/0172424 A1* | 7/2009 | Cai et al. | 713/300 |
| 2009/0217277 A1* | 8/2009 | Johnson et al. | 718/102 |
| 2009/0241043 A9 | 9/2009 | Balthaser | |
| 2014/0115357 A1* | 4/2014 | Li et al. | 713/320 |

\* cited by examiner

METHOD AND APPARATUS FOR SELECTING AN OPERATING FREQUENCY OF A CENTRAL PROCESSING UNIT, BASED ON DETERMINING A MILLIONS OF INSTRUCTION PER SECOND (MIPS) VALUE ASSOCIATED WITH THE CENTRAL PROCESSING UNIT

CROSS REFERENCE TO RELATED APPLICATIONS

The present disclosure is a continuation of and claims priority to U.S. patent application Ser. No. 12/942,599, filed Nov. 9, 2010, now U.S. Pat. No. 8,732,488, issued May 20, 2014, which claims priority to U.S. Provisional Patent Application No. 61/260,722, filed Nov. 12, 2009. U.S. patent application Ser. No. 12/942,599 is also a continuation-in-part of and claims priority to U.S. patent application Ser. No. 12/400,604, filed Mar. 9, 2009, now U.S. Pat. No. 8,281,160, issued Oct. 2, 2010, which claims priority to U.S. Provisional Patent Application No. 61/045,714, filed Apr. 17, 2008, which are incorporated herein by reference.

TECHNICAL FIELD

Embodiments of the present invention relate to the field of power management, and more particularly, to power management within Systems on Chips (SOCs).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In general, for various micro-architecture platforms for SOCs, an adaptive power management technique may be utilized that dynamically characterizes workloads based on system-level events and adapts frequency and voltage in order to save power dissipation. An overall framework for embedded software-based power management may include two basic components, specifically, a performance/idle profiler and a policy manager. The profiler is responsible for probing the system, collecting statistics from a performance monitoring unit and operating system, and making the statistics available to the policy manager. The policy manager may then use these inputs and statistics in order to optimally choose a suitable system operating point (including core, bus, memory frequency, processor states and voltages) and even different power modes to save power while satisfying an application's dynamic performance needs.

SUMMARY

The present disclosure also provides a method that comprises, within a sample window, determining an active time of a central processing unit (CPU) at an operating frequency. If there are any different operating frequencies within the sample window, the method further comprises determining active times of the CPU at the different operating frequencies within the sample window and, based upon the active times for the operating frequencies within the sample window, calculating a millions of instructions per second (MIPS) value for the sample window. The method further comprises performing a comparison of the MIPS value to a threshold value and, based upon the comparison of the MIPS value to the threshold value, setting an operating frequency of the CPU for a next sample window.

The present disclosure also provides an apparatus comprising a central processing unit (CPU) and a power management framework in communication with the CPU. The power management framework includes a policy manager configured to determine an active time of the CPU at an operating frequency within a sample window and, if there are any different operating frequencies within the sample window, determine active times of the CPU at the different operating frequencies within the sample window. Based upon the active times for the operating frequencies within the sample window, the policy manager is further configured to calculate a millions of instructions per second (MIPS) value for the sample window, perform a comparison of the MIPS value to a threshold value and, based upon the comparison of the MIPS value to the threshold value, set an operating frequency of the CPU for a next sample window.

The present disclosure also provides a computer readable medium having instructions stored thereon that, if executed, result in a power management module determining an active time of a central processing unit (CPU) at an operating frequency within a sample window, and if there are any different operating frequencies within the sample window, determining active times of the CPU at the different operating frequencies within the sample window. Based upon the active times for the operating frequencies within the sample window, the instructions result in the power management module calculating a millions of instructions per second (MIPS) value for the sample window, performing a comparison of the MIPS value to a threshold value and, based upon the comparison of the MIPS value to the threshold value, setting an operating frequency of the CPU for a next sample window.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1A:
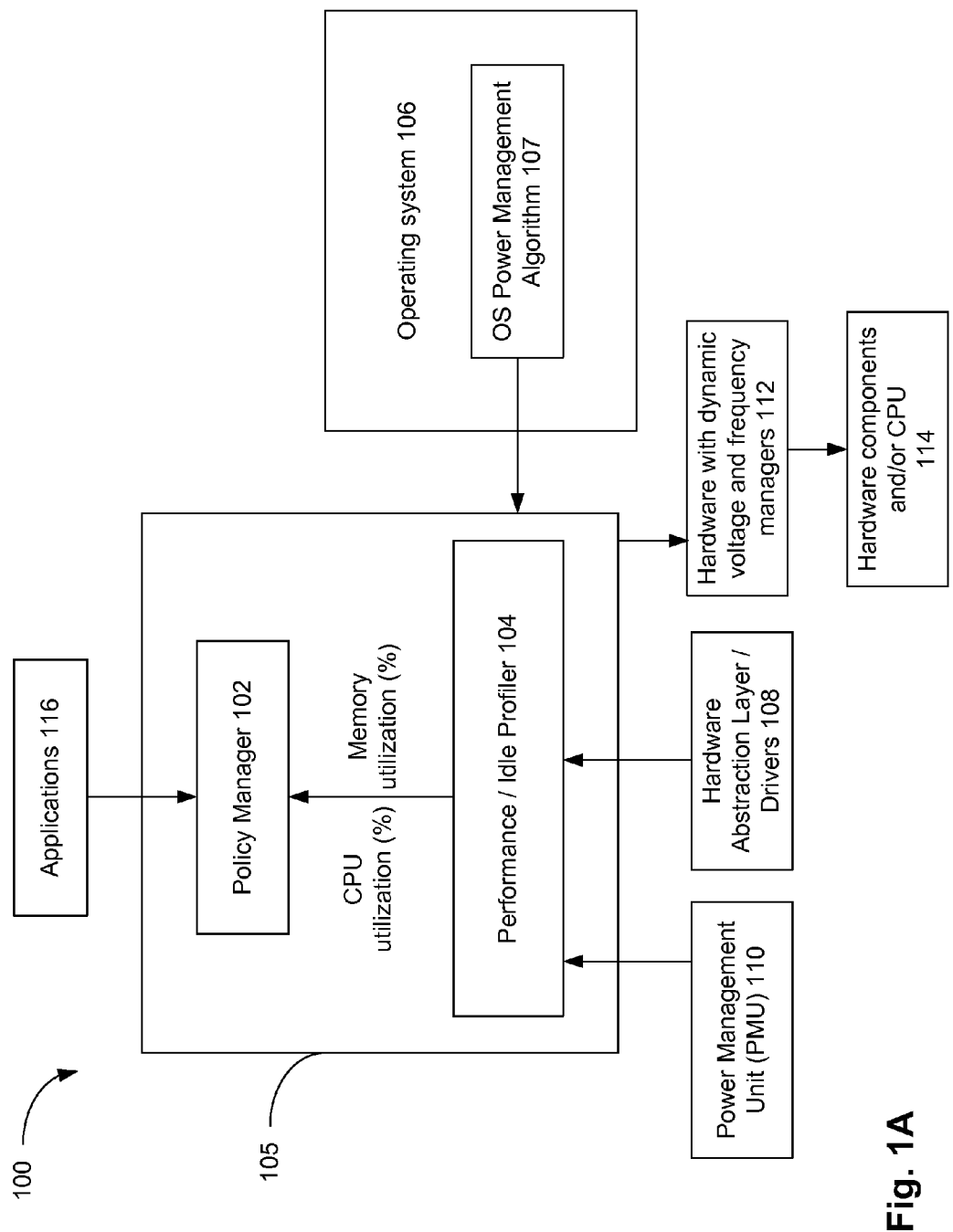
FIG. 1A schematically illustrates a block diagram of a power management framework for a micro-architecture-based platform, in accordance with various embodiments of the present invention.

FIG. 1A schematically illustrates a block diagram of a power management framework 100 for a micro-architecture-based platform for use with systems on chips (SOCs). The power management framework 100 is utilized to control power consumption within an SOC. The power management framework 100 includes a policy manager 102 and a performance/idle profiler 104, which can collectively be referred to as power management module 105. An operating system (OS) 106 is included having an operating system power management algorithm 107 embedded therein. In accordance with various embodiments, the OS 106 is a Windows Mobile® operating system available from Microsoft® and the power management algorithm is stored within a kernel space of the OS 106 that serves as a memory. The OS 106 may, in accordance with other embodiments, be another type of operating system. For example, the OS 106 may be a Linux operating system. Likewise, the power management algorithm may, in accordance with other embodiments, be stored within a user space of the OS 106. A hardware abstraction layer/driver 108 and a performance monitoring unit (PMU) 110 are also included, which help provide statistics and/or other information to the performance/idle profiler 104. Hardware 112 that includes dynamic voltage and frequency managers is also illustrated. Hardware 112 manages voltage and operating frequencies of hardware and/or central processing unit (CPU) 114 of the SOC. Applications 116 for execution within the SOC are also illustrated.

The power management framework 100 is an adaptive power management framework that can be characterized as dynamically executing system-level work loads and adapting frequencies and voltages to save system power within an SOC. The power management framework 100 is configured to cause the SOC to consume a minimal amount of system power by automatically configuring system resources while still maintaining an acceptable performance in an end-user's experience.

In accordance with various embodiments, the performance/idle profiler 104 collects two types of system statistics within the power management framework 100 of FIG. 1A. The first type of statistic is generally CPU utilization calculated based on operating system idle threads, which is generally the most direct indicator of CPU occupancy. The second type of statistic that the performance/idle profiler 104 collects is memory utilization, which may be calculated based upon system performance by probing with the PMU 110.

Thus, in the power management framework 100, the performance/idle profiler 104 is configured to collect timing data from idle and/or active threads (generally from idle threads) during sampling windows. The performance/idle profiler 104 calculates CPU utilization, based upon the timing data, within the user space of the OS 106. In accordance with various embodiments, the performance/idle profiler 104 calculates CPU utilization within the kernel space of the OS 106. Both the CPU utilization calculated and collected by the performance/idle profiler 104, as well as any memory statistics collected by the performance/idle profiler 104, are delivered to the policy manager 102 at the end of each sampling window such that optimal hardware resources may be appropriately assigned by the policy manager 102 for future use to decrease power dissipation and satisfy performance requirements at the same time of hardware and/or CPU 114 based upon applications 116 to be executed within the SOC.

At the end of each sampling window, both CPU utilization and memory statistics in the current window are delivered to the policy manager 102. The policy manager 102, in turn, may choose a desired power mode in terms of lowest power dissipation from all power modes with enough bandwidth for one or more applications 116 and then reschedule system resources as needed for the next sampling window. In accordance with various embodiments of the present invention, the power management framework 100 includes providing the policy manager 102 with, in addition to the CPU utilization and memory statistics, a power profiling for both an active power mode and an idle power mode.

Figure 1B:
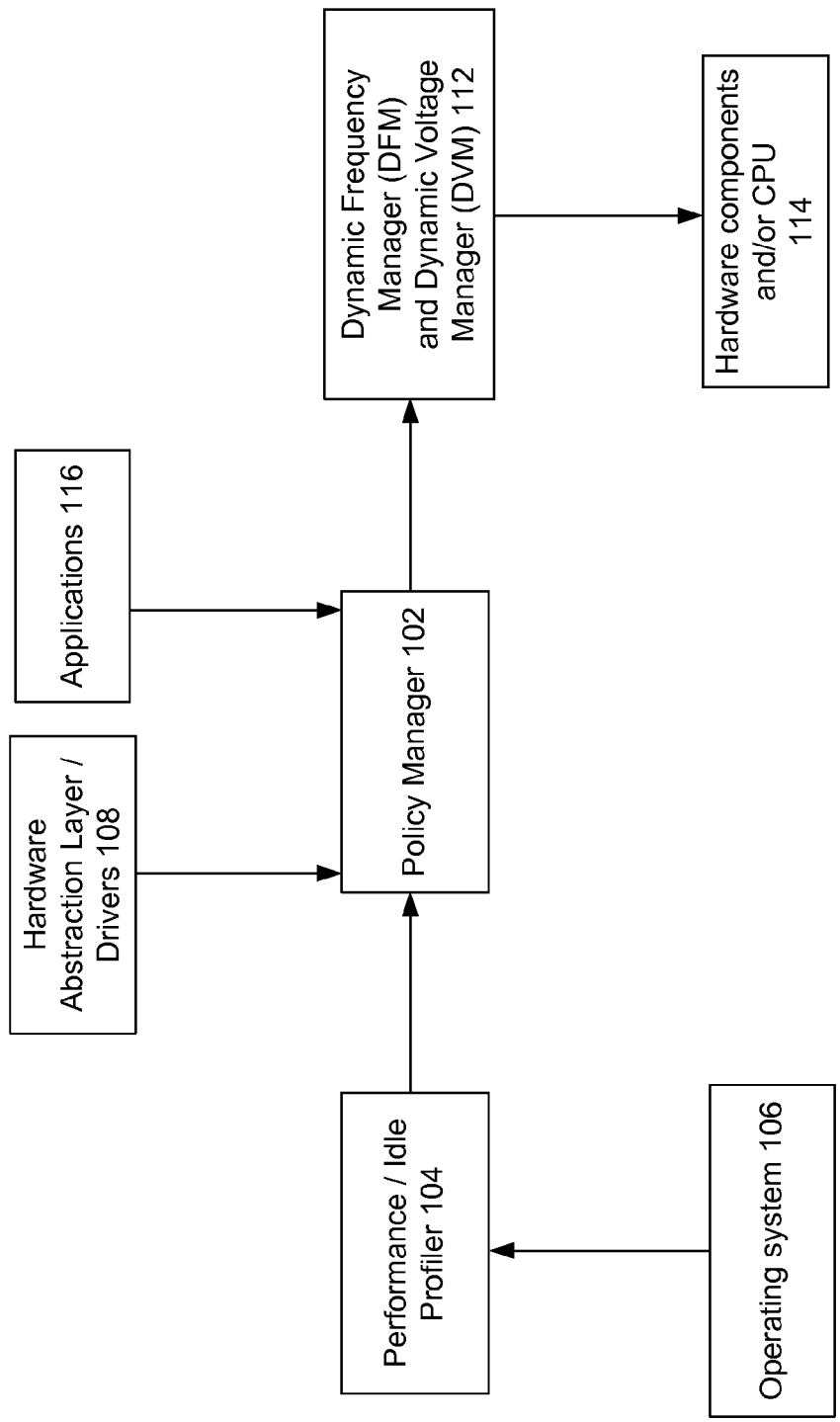
FIG. 1B schematically illustrates a block diagram illustrating interaction among various components of the power management framework illustrated in FIG. 1A, in accordance with various embodiments of the present invention.

More particularly, referring to FIG. 1B, the OS 106 provides the timing information to the performance/idle profiler 104 and the PMU 110 provides memory statistics to the performance/idle profiler 104. The performance/idle profiler 104 calculates CPU utilization and provides CPU utilization and statistics to the policy manager 102. The policy manager 102 determines, based upon the CPU utilization and/or statistics whether the hardware 112 that includes dynamic voltage and frequency managers should alter an operating frequency and/or power for any of the hardware and/or CPU 114 of the SOC, as will be described more fully herein.

Figure 2:
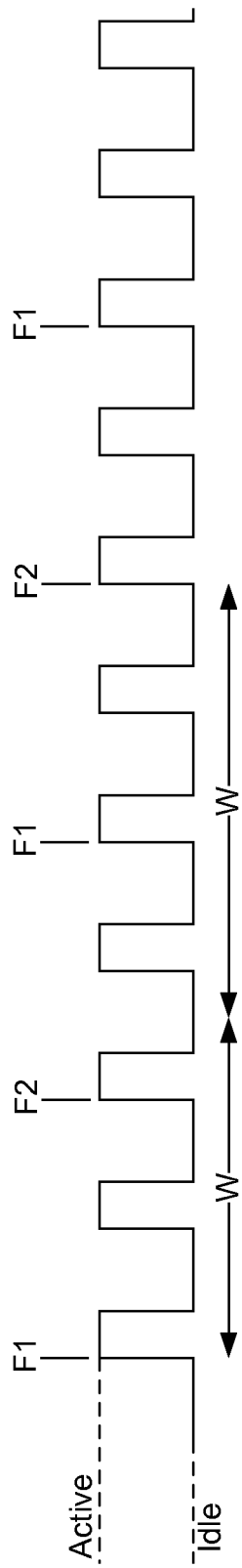
FIG. 2 illustrates a timing diagram of operating frequencies for a CPU of an SOC that includes the power management framework illustrated in FIGS. 1A and 1B, in accordance with various embodiments of the present invention.

With reference to FIG. 2, a timing diagram of operating frequencies for the CPU is illustrated. As can be seen, the CPU alternates between run time or "active time" and idle time. Thus, during the active time, the CPU is active processing threads, while during idle time, the CPU is idle, i.e., not processing any threads. Sample windows W are illustrated. Operating frequency changes are illustrated at $F_1$ and $F_2$. The operating frequency changes generally occur more frequently than illustrated and there are generally more than two operating frequency changes. FIG. 2 is presented as it is for clarity purposes.

In order to predicatively set operating frequencies for the CPU, in accordance with various embodiments of the present disclosure, active time information is gathered for the various operating frequencies of the CPU during a sample window W.

In accordance with various embodiments, the sample window is one second, but other sample window sizes may be used if desired.

During a sample window, the power management algorithm 107 causes the performance/idle profiler 104 to gather statistics with respect to active time and/or idle time for the CPU at the various operating frequencies as illustrated in FIG. 2. Thus, for example, as may be seen in Table 1, statistics are gathered that track the active time and the idle time at each of five frequencies. In this example, the five frequencies are 60 megahertz (MHz), 156 MHz, 208 Mhz, 416 MHz and 624 MHz. Thus, the total window size for the sample window is the sum of all of the active times and the idle times, which, as previously stated, is generally one second. The CPU utilization at each frequency point can be computed correspondingly as shown in Table 2.

TABLE 1

| CPU Frequency (MHz) | Active Mode | Idle Mode |
|---|---|---|
| 60 | Duration00 | Duration01 |
| 156 | Duration10 | Duration11 |
| 208 | Duration20 | Duration21 |
| 416 | Duration30 | Duration31 |
| 624 | Duration40 | Duration41 |

TABLE 2

| CPU Frequency (MHz) | Active Mode | Idle Mode | CPU % |
|---|---|---|---|
| 60 | A00 | I01 | A00/(A00 + I01) |
| 156 | A10 | I11 | A10/(A10 + I11) |
| 208 | A20 | I21 | A20/(A20 + I21) |
| 416 | A30 | I31 | A30/(A30 + I31) |
| 624 | A40 | I41 | A40/(A40 + I41) |

In accordance with various embodiments, a total Millions of Instructions Per Second (MIPS) is calculated. The calculation can be done in accordance with Eq. 1. As can be seen in Eq. 1, the idle time for each operating frequency cancels out of the equation and therefore, the total MIPS can be calculated in accordance with Eq. 2. Thus, the data that needs to be gathered and stored, in accordance with various embodiments of the present invention, is the active time within a sample window at all five operating frequencies, as illustrated in Table 3. The only data that needs to be stored, based upon Eq. 2, is the information in Table 3 for a single, previous sampling window. In accordance with various embodiments, data from multiple sampling windows may be stored if desired. Additionally, in accordance with various embodiments, the data in Table 3 is stored in the kernel space of the OS 106 along with the power management algorithm 107. In accordance with various embodiments, Table 3 may be stored in the user space of the OS 106. Table 3 may be stored in the same space of the OS 106 as the power management algorithm 107, or Table 3 and the power management algorithm 107 may be stored in different spaces within the OS 106.

$$MIPS = 60 \times \frac{A00}{A00 + I01} \times \frac{A00 + I01}{W} + 156 \times \frac{A10}{A10 + I11} \times \frac{A10 + I11}{W} + 208 \times \frac{A20}{A20 + I21} \times \frac{A20 + I21}{W} + $$

$$416 \times \frac{A30}{A30 + I31} \times \frac{A30 + I31}{W} + 624 \times \frac{A40}{A40 + I41} \times \frac{A40 + I41}{W} \quad \text{Eq. 1}$$

$$MIPS = 60 \times \frac{A00}{W} + 156 \times \frac{A10}{W} + 208 \times \frac{A20}{W} + 416 \times \frac{A30}{W} + 624 \times \frac{A40}{W} \quad \text{Eq. 2}$$

TABLE 3

| CPU Frequency (MHz) | Active Mode |
|---|---|
| 60 | Duration00 |
| 156 | Duration10 |
| 208 | Duration20 |
| 416 | Duration30 |
| 624 | Duration40 |

Once a total MIPS calculation for the sample window has been calculated, the MIPS can be utilized to adjust and manage the operating load and power use of the SOC, including hardware and/or CPU 114, based upon applications 116 to be executed within the SOC. The information from the previous sample window can be used to predict or select an operating frequency and power for the SOC at the beginning of the next sample window, and to configure the SOC accordingly. This can be done by comparing the MIPS calculated in the previous sample window with a threshold. For example, if a MIPS value is determined to be 42 and the threshold states that for MIPS below 50, the initial operating frequency for the next sample window should be set lower, then the next sample window begins operation at a lower operating frequency, for example, at 60 MHz. With this determination, the dynamic voltage and frequency managers can adjust the voltage, and thereby the power, requirements for the SOC accordingly. Alternatively, if a MIPS calculation is determined to be greater than 50, then the operating frequency for the next sample window can be set to begin at a higher operating frequency, for example, 156 MHz and the dynamic frequency and voltage managers can adjust the voltage and power for the SOC accordingly. Accordingly, the power management framework 100 of the present disclosure can help the SOC operate more efficiently and at greater power savings.

Figure 3:
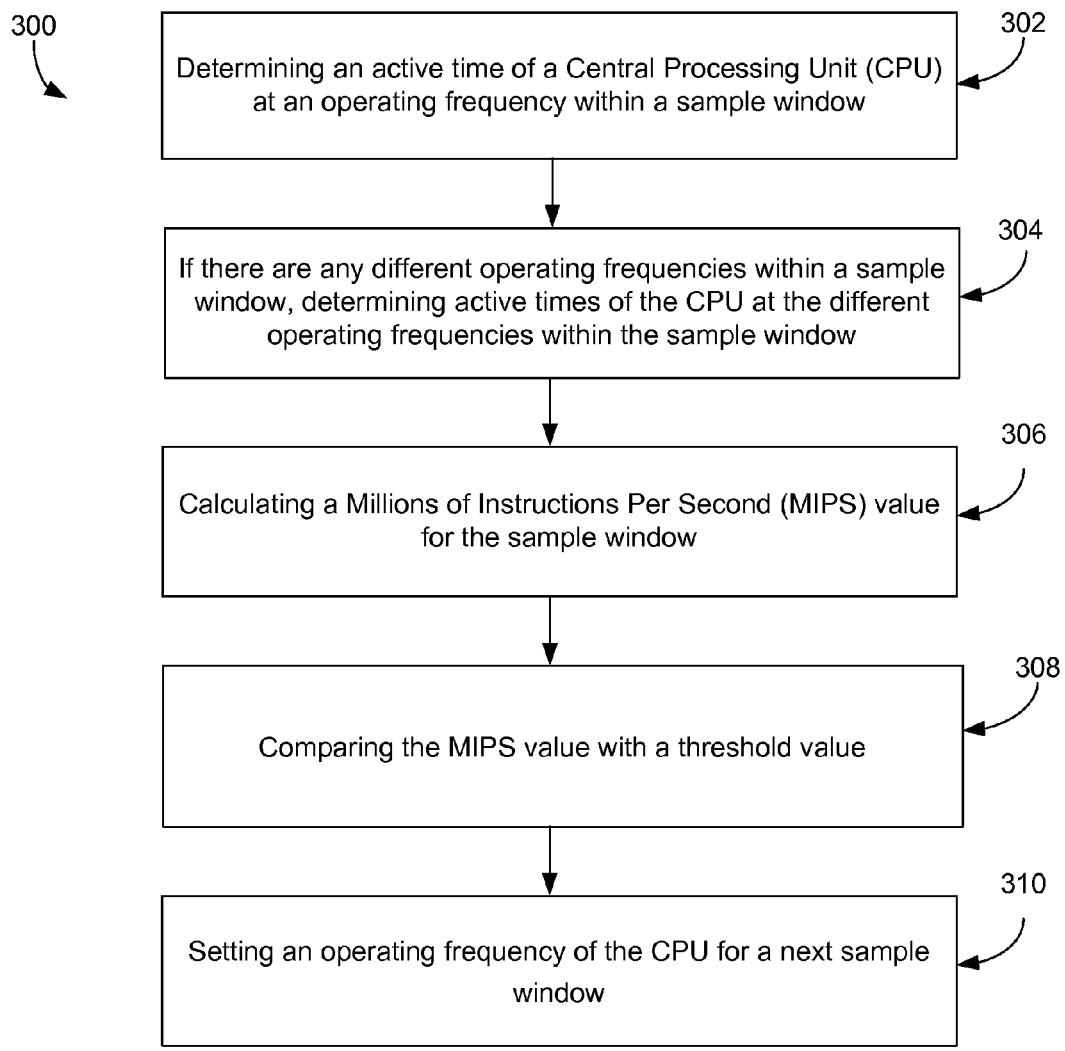
FIG. 3 is a flowchart illustrating a power management method that may be carried out by the power management framework illustrated in FIGS. 1A and 1B, in accordance with various embodiments of the present invention.

FIG. 3 is a flowchart describing a method in accordance with various embodiments of the present disclosure. At 302, within a sample window, an active time of a Central Processing Unit (CPU) at an operating frequency is determined. At 304, if there are any different operating frequencies within the sample window, active times of the CPU at the different operating frequencies within the sample window are determined. At 306, based on upon the active times for the operating frequencies within the sample window, a Millions of Instructions Per Second (MIPS) value for the sample window is calculated. At 308, a comparison of the MIPS value to a threshold value is performed. At 310, based upon the comparison of the MIPS value to the threshold value, an operating frequency of the CPU is set for a next sample window.

In accordance with various embodiments, an article of manufacture may be provided that includes a non-transitory storage medium having instructions stored thereon that, if executed, result in the actions described herein with respect to FIGS. 1A, 1B and 2. In an embodiment, the storage medium comprises some type of memory (not shown). In accordance with various embodiments, the article of manufacture may be a computer-readable medium such as, for example, software or firmware.

In accordance with other embodiments, the present disclosure may be applied to a graphics processing unit (GPU) utilization and/or a video processing unit (VPU) utilization as opposed to, or in conjunction, with CPU utilization. The present disclosure is not limited in this regard.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
    monitoring an operation of a processing unit within a first time window, wherein within the first time window, the processing unit operates in an active power mode at (i) a first frequency for a first time period, and (ii) a second frequency for a second time period;
    determining, (i) based on the first frequency and the first time period, a first factor, and (ii) based on the second frequency and the second time period, a second factor;
    based on the first factor and the second factor, determining a millions of instructions per second (MIPS) value for the first time window, wherein the MIPS value for the first time window is based on a ratio of (i) a sum value that is based on a sum of the first factor and the second factor, and (ii) a duration of the first time window; and
    based on the MIPS value for the first time window, selecting an operating frequency of the processing unit for a second time window that occurs subsequent to the first time window.

2. The method of claim 1, further comprising:
    comparing the MIPS value for the first time window to a threshold value,
    wherein selecting the operating frequency of the processing unit for the second time window comprises
        based on comparing the MIPS value for the first time window to the threshold value, selecting the operating frequency of the processing unit for the second time window.

3. The method of claim 1, wherein:
    the first factor is based on a product of the first frequency and the first time period; and
    the second factor is based on a product of the second frequency and the second time period.

4. The method of claim 1, wherein:
    within the first time window, the processing unit operates in the active power mode at a plurality of frequencies, wherein the plurality of frequencies includes the first frequency and the second frequency;
    within the first time window and for each frequency of the plurality of frequencies, the processing unit operates in the active power mode for a corresponding time period of a plurality of time periods, wherein the plurality of time periods includes the first time period and the second time period;
    the method further comprises
        determining a plurality of factors, wherein the plurality of factors includes the first factor and the second factor, wherein each factor of the plurality of factors is based on (i) a corresponding frequency of the plurality of frequencies and (ii) a corresponding time period of the plurality of time periods; and
    determining the MIPS value for the first time window further comprises
        based on the plurality of factors, determining the MIPS value for the first time window.

5. The method of claim 4, wherein:
    the sum value is further based on a sum of the plurality of factors.

6. The method of claim 5, wherein each factor of the plurality of factors is based on a product of (i) the corresponding frequency of the plurality of frequencies and (ii) a corresponding duration of the corresponding time period of the plurality of time periods.

7. The method of claim 1, wherein:
    the processing unit operates in the active power mode at the first frequency for the first time period by actively processing threads, while operating at the first frequency, for the first time period; and
    the processing unit operates at the second frequency for the second time period by actively processing threads, while operating at the second frequency, for the second time period.

8. The method of claim 1, further comprising:
    based on the MIPS value for the first time window, adjusting an operating voltage of the processing unit for the second time window.

9. The method of claim 1, wherein the selected operating frequency of the processing unit for the second time window is an initial operating frequency of the processing unit at a start of the second time window.

10. An apparatus comprising:
    a processing unit; and
    a power management framework in communication with the processing unit, wherein the power management framework includes a policy manager, wherein the policy manager is configured to
        monitor an operation of the processing unit within a first time window, wherein within the first time window, the processing unit operates in an active power mode at (i) a first frequency for a first time period, and (ii) a second frequency for a second time period,
        determine, (i) based on the first frequency and the first time period, a first factor, and (ii) based on the second frequency and the second time period, a second factor,
        based on the first factor and the second factor, determine a millions of instructions per second (MIPS) value for the first time window, wherein the MIPS value for the first time window is based on a ratio of (i) a sum value that is based on a sum of the first factor and the second factor, and (ii) a duration of the first time window, and
        based on the MIPS value for the first time window, select an operating frequency of the processing unit for a second time window that occurs subsequent to the first time window.

11. The apparatus of claim 10, wherein the policy manager is further configured to:
    compare the MIPS value for the first time window to a threshold value; and
    based on comparing the MIPS value for the first time window to the threshold value, select the operating frequency of the processing unit for the second time window.

12. The apparatus of claim 10, wherein:
    the first factor is based on a product of the first frequency and the first time period; and the second factor is based on a product of the second frequency and the second time period.

13. The apparatus of claim 10, wherein:

within the first time window, the processing unit operates in the active power mode at a plurality of frequencies, wherein the plurality of frequencies includes the first frequency and the second frequency;

within the first time window and for each frequency of the plurality of frequencies, the processing unit operates in the active power mode for a corresponding time period of a plurality of time periods, wherein the plurality of time periods includes the first time period and the second time period;

the policy manager is further configured to determine a plurality of factors, wherein the plurality of factors includes the first factor and the second factor, wherein each factor of the plurality of factors is based on (i) a corresponding frequency of the plurality of frequencies and (ii) a corresponding time period of the plurality of time periods; and the policy manager is further configured to determine the MIPS value for the first time window by based on the plurality of factors, determining the MIPS value for the first time window.

14. The apparatus of claim 13, wherein:

the sum value is based on a sum of the plurality of factors.

15. The apparatus of claim 14, wherein each factor of the plurality of factors is based on a product of (i) the corresponding frequency of the plurality of frequencies and (ii) a corresponding duration of the corresponding time period of the plurality of time periods.

16. The apparatus of claim 10, wherein:

the processing unit operates at the first frequency for the first time period by actively processing threads, while operating at the first frequency, for the first time period; and the processing unit operates at the second frequency for the second time period by actively processing threads, while operating at the second frequency, for the second time period.

17. The apparatus of claim 10, the policy manager is further configured to:

based upon the MIPS value for the first time window, adjust an operating voltage of the processing unit for the second time window.

18. The apparatus of claim 10, wherein the selected operating frequency of the processing unit for the second time window is an initial operating frequency of the processing unit at a start of the second time window.

\* \* \* \* \*